March 31, 1970     HIROYASU SHIOKAWA     3,503,246

METHOD OF MANUFACTURING A SPIRAL METAL TUBE

Filed Dec. 28, 1967     5 Sheets-Sheet 1

HIROYASU SHIOKAWA
INVENTOR.

BY Wenderoth, Lind & Ponack.
attorneys

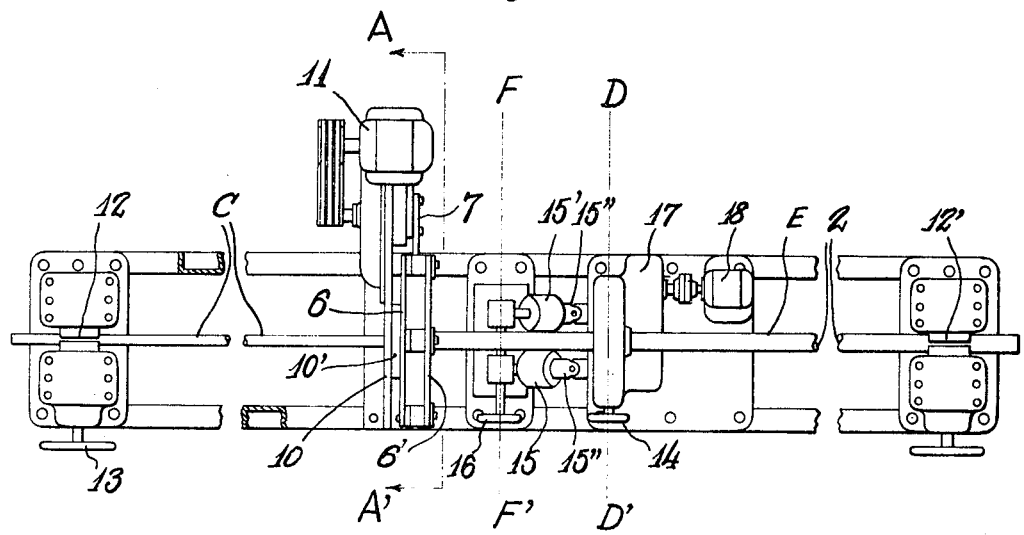
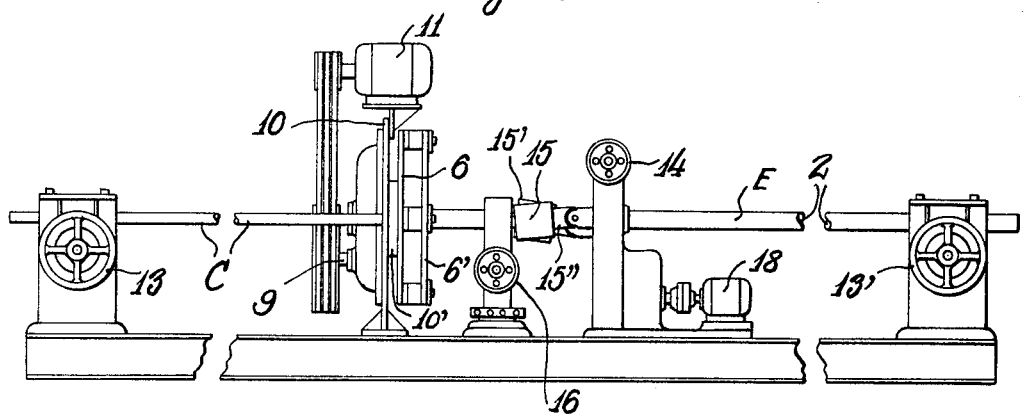

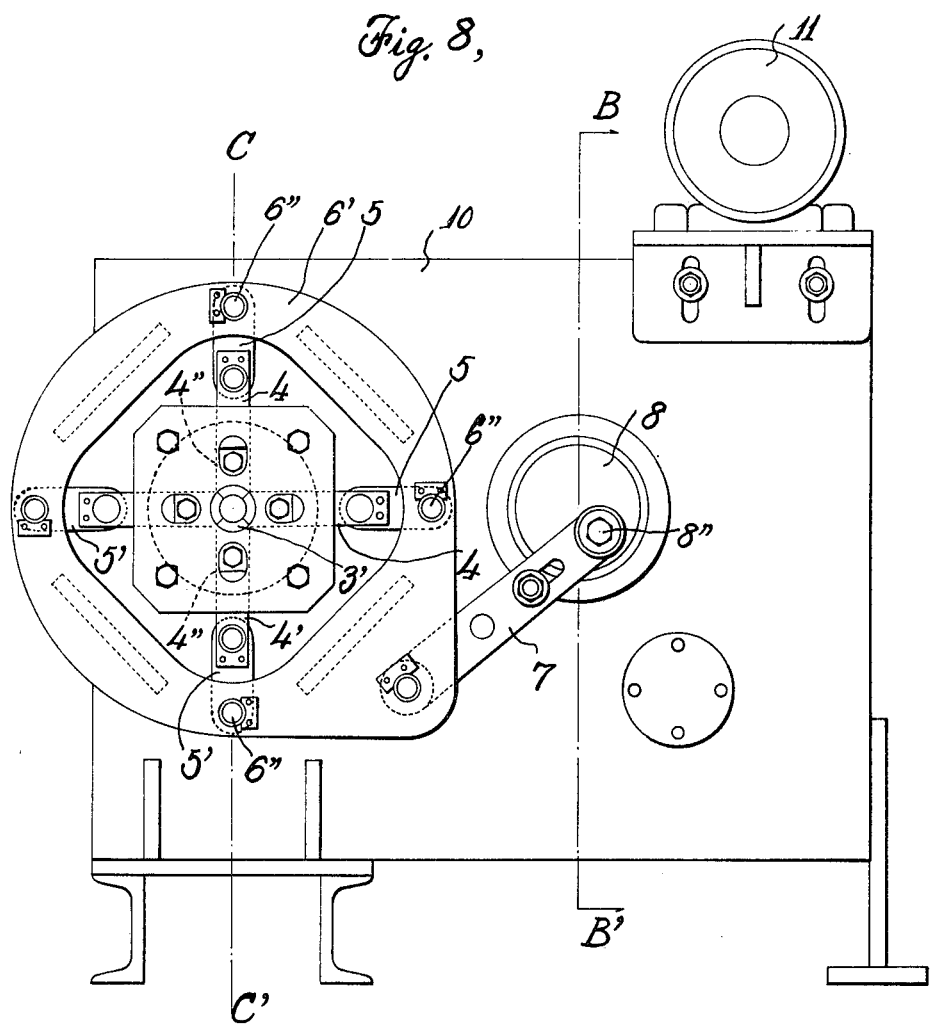

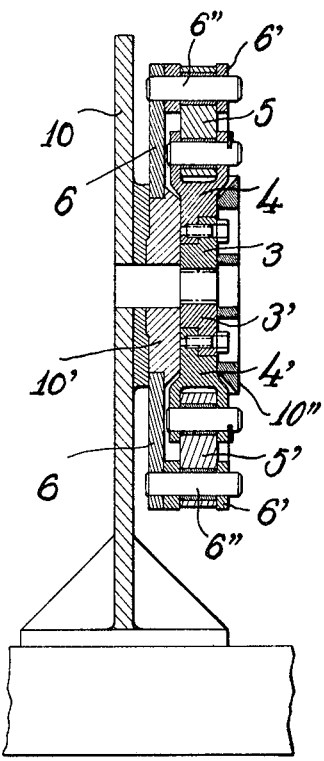
Fig. 10,
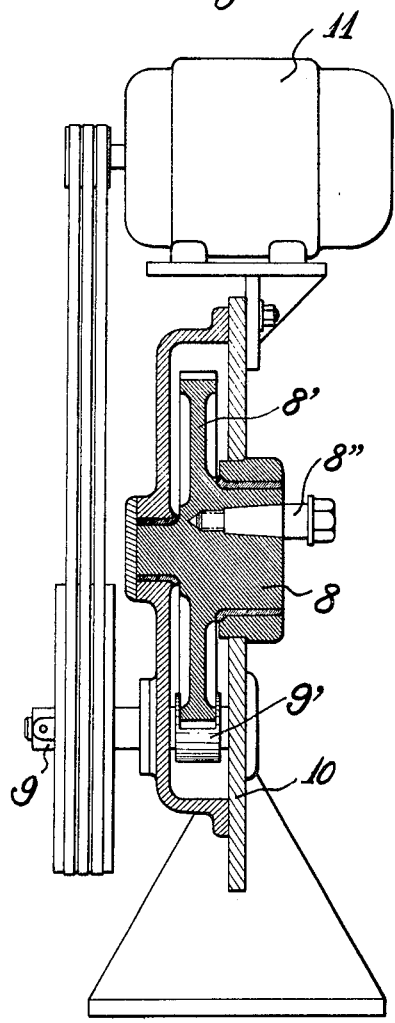
Fig. 9,

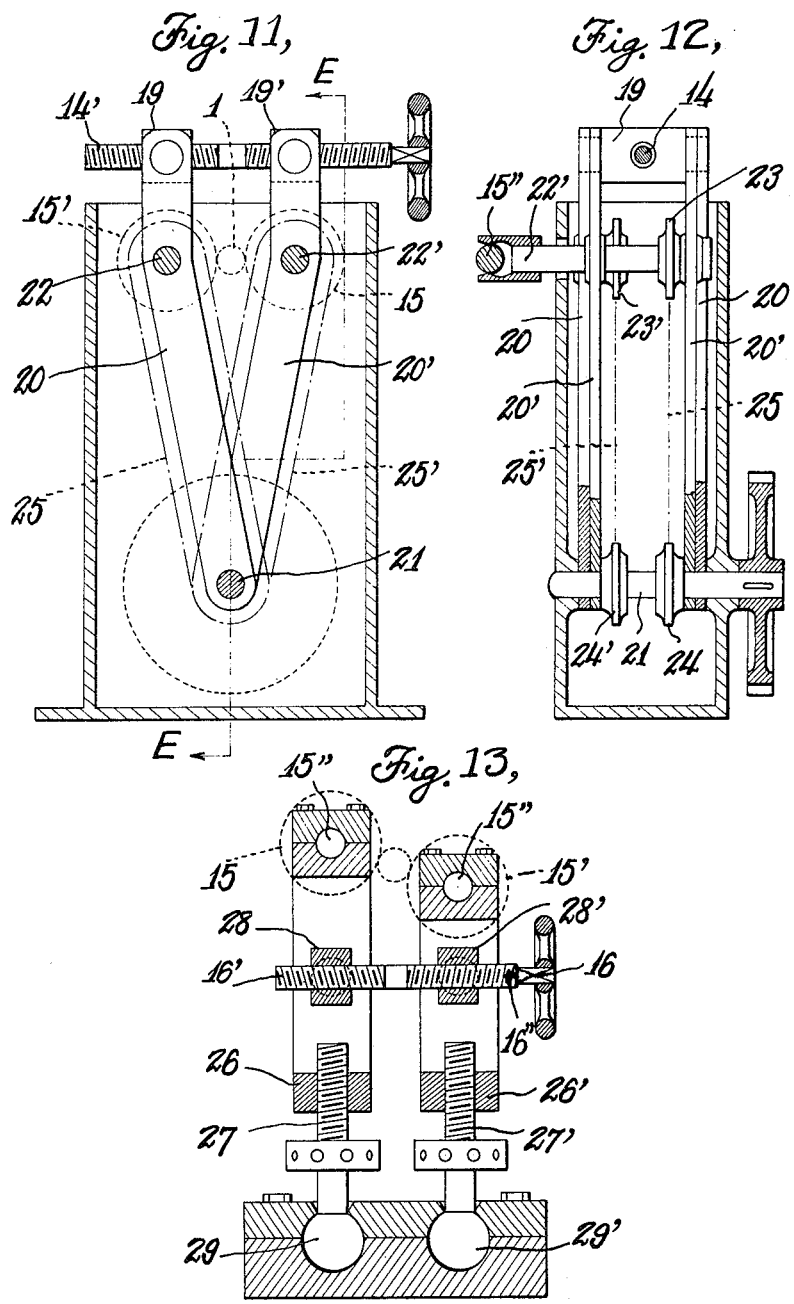

United States Patent Office 3,503,246
Patented Mar. 31, 1970

3,503,246
METHOD OF MANUFACTURING A SPIRAL METAL TUBE
Hiroyasu Shiokawa, 28 Sone-Nishino-cho, 2-chome, Toyonaka, Osaka-fu, Japan
Filed Dec. 28, 1967, Ser. No. 694,236
Int. Cl. B21d 17/02
U.S. Cl. 72—370                                       2 Claims

ABSTRACT OF THE DISCLOSURE

A spiral metal tube is formed by alternately urging a tubular workpiece over a cylindrical core formed externally as a helix and pressing dies formed with a female screw surface into said workpiece to cause said workpiece to conform to the shape of said helix.

---

The invention relates to a method for facilitating the manufacture of a steel, copper or aluminum tube with spiral grooves on its periphery and with substantially even thickness all over.

A spiral metal tube has elasticity and flexibility, and accordingly it is suitable for use as a connecting tube for a liquid. It is also suitable as a liquid tube in, for example a heat exchanger, because its surface area is larger than that of an ordinary metal tube. However, no suitable method has yet been found for manufacturing a long spiral metal tube with deep grooves and with substantially even thickness all over.

The invention has settled this problem by employing two processes, one in which a cylindrical metal core with a spiral part is firmly held and a material is applied thereto and is urged forwardly as it turns, and the other process in which the material applied on the cylindrical metal core is pressed hard by female screw dies against the spiral part of the cylindrical metal core preferably in such a way as the pressing motion of some dies and that of the other dies are given to the material tube alternately and repeatedly.

By these processes, it has become easy to manufacture a long metal tube with deep spiral grooves and of considerable and substantially even thickness all over. Moreover, it has become possible to operate the manufacturing equipment accurately and to reduce the cost of manufacture.

The invention will now be described with particular reference to the accompanying drawings, wherein thereof, and in which:

FIG. 6 is a side view of the equipment of the present invention;

FIG. 7 is a plan view of it;

FIG. 8 is a section along the A–A' line in FIG. 7, to show the mechanism for pressing by the dies;

FIG. 9 is a vertical section along the B–B' line in FIG. 8;

FIG. 10 is a vertical section along the C–C' line in FIG. 8;

FIG. 11 is a horizontal section along the D–D' line in FIG. 7;

FIG. 12 is a vertical section along the E–E' line in FIG. 11; and

FIG. 13 is a horizontal section along the F–F' line in FIG. 7.

Figure 1:
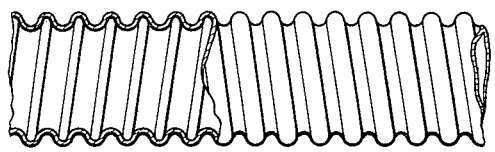
FIG. 1 is a longitudinal section and side view of the spiral metal tube manufactured in accordance with the present invention.
Figure 3:
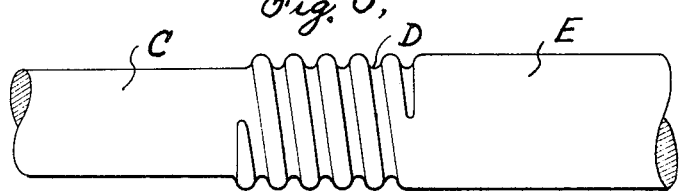
FIG. 3 is a magnified side view of a part of it.
Figure 2:
FIG. 2 is a side view of the cylindrical metal core.
Figure 4:
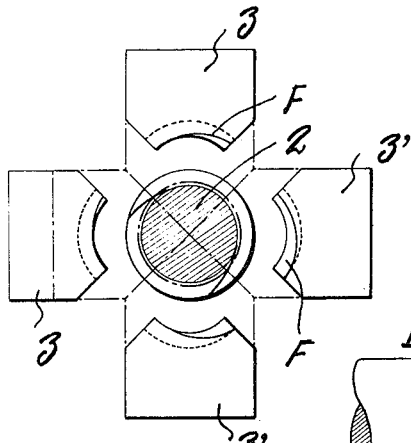
FIG. 4 is a front view to show the relation between the cylindrical metal core and the dies.

As shown in the drawings, the present invention is characterized by preparing a cylindrical metal core 2 which has a large diameter part E, a small diameter part C and a spiral part D between the two so that a tubular workpiece is put into the large diameter part E and a spiral tube produced from the workpiece is urged forwardly onto the small diameter part C, holding the cylindrical metal core 2 firmly by vices, setting rollers 15, 15' in a contrasting position on both sides of the large diameter part E in such a way as they can rotate in conformity with the direction of the grooves of the spiral part D, setting dies 3, 3' to press the circumference of the workpiece hard in such a way as they can slide along guide grooves, linking the dies with a swinging plate 6 through the intermediary of linking levers 5, 5', turning a swinging plate 6 reciprocally by a crank 8 through a crank lever 7, and letting the dies 3,3' move to and fro against the workpiece.

Referring to the drawings, a component part marked 2 is a cylindrical metal core with a helical groove D near its centre. On the right of the spiral or helix D is a large diameter section E which accords with the inside diameter of the tubular workpiece, and on the left is a small diameter section C which accords with the minimum inside diameter of the spiral tube produced from the workpiece. The cylindrical metal core 2 is firmly held by vices 12, 12'. However, for continuous manufacture of the spiral tube, the number of the vices holding the large diameter section E may be increased to two. In this case, attention must be paid not to open the two vices at the same time.

Another component part marked 10 is a crank plate into which the cylindrical metal core 2 is inserted. Between guide plates 10', 10'' (see FIG. 10) fixed to the crank plate 10, guide grooves 4'' (FIG. 8) are provided in a radial form, to which sliding pieces 4, 4' are set. The inner ends of the sliding pieces are respectively connected with dies 3, 3' which each have a female screw surface F (FIG. 5) to accord with the spiral part D of the cylindrical metal core 2. While, the outer ends of the sliding pieces 4, 4' are respectively hinged on the inner ends of linking levers 5, 5' which are hinged on rotary plates 6, 6' by pins 6''.

The rotary plates 6, 6' (FIG. 10) are set on the circumference of the guide plate 10' in such a way as they can turn freely, and are linked (FIG. 8) with a crank 8 through a crank lever 7 and by a crank pin 8''. A large gear 8' (FIG. 9) of the crank 8 is engaged with a gear 9' of a shaft 9 which is driven by a motor 11. Thus, as the crank 8 turns, the swinging plates 6, 6' make a reciprocal swing motion to the left and right in such a way as one reciprocal motion of said plates makes the dies 3, 3' move to and fro twice against the spiral part D of the cylindrical metal core 2 through the intermediary of the linking levers 5, 5' and sliding pieces 4, 4'.

Rubber-coated rollers 15, 15' are provided for feeding the tubular workpiece into the pressing mechanism after the latter is put on the cylindrical metal core 2. As shown in FIG. 13 these rollers are placed in such a way that their shafts 15'' incline in opposite directions so that their circumferences can accord with the direction of the grooves of the spiral part D.

As shown in FIG. 11 and FIG. 12, the shafts 15'' are respectively connected by a universal joint with shafts 22, 22' which are held by arms 20, 20'. The lower ends of the arms 20, 20' are loosely set on a driving shaft 21 and their upper ends are open in a V shape. Onto the upper ends of the arms 20, 20' are set connectors 19, 19' in such a way as they can move freely. These connectors 19, 19' are engaged with screws 14', 14" of opposite handedness which are provided on a roller control shaft 14. Thus, as the roller control shaft 14 turns, the rollers 15, 15' move to and fro.

Chain sprockets 23, 23' provided on the shafts 22, 22' and other chain sprockets 24, 24' fixed on a drive shaft 21 are connected by driving chains 25, 25'. As the drive shaft 21 is turned by a motor 18 through a reduction gear 17, the rollers 15, 15' turn in opposite directions letting the workpiece 1 turn and be urged forward in accordance with the screw pitch of the spiral part D.

As shown in FIG. 13, the other ends of the shafts 15" are respectively supported by bearings 26, 26', the lower parts of which are engaged with screw shafts 27, 27' which are connected with spherical elements 29, 29' on the machine frame in such a way that they can move freely. Thus, by turning the screw shafts 27, 27', it is possible to lift or lower the bearings 26, 26'. Further, nuts 28, 28' are set onto the bearings 26, 26' and are engaged with screws 16', 16" of opposite handedness which are provided on a control shaft 16. Thus, by turning the control shaft 16, it is possible to move the shafts of the rollers 15, 15' to and fro.

The workpiece forwarding mechanism consisting of the rollers 15, 15' may also be provided in the rear of the crank case 10 (this is not shown in the drawing), whereby the top of the spiral tube produced from the tubular workpiece can be urged forwards as it turns.

The manufacturing method urging the abovementioned apparatus is as follows: the vice 12' provided for firmly holding the right end of the large diameter section E of the cylindrical metal core 2 is opened to allow the tubular workpiece to be put onto the right end of the cylindrical metal core 2, and is then closed again. After inserting the workpiece 1 between the rollers 15, 15', the motor 18 is driven and its motion is conveyed to the rollers 15, 15' through the reduction gear 17, and thus the material tube is urged forwards as it turns. Then, the crank 8 is driven by the motor 11, whereby the swinging plates 6, 6' make reciprocal swinging motion, being driven by the crank lever 7. This reciprocal motion, through the linking levers 5, 5' and the sliding pieces 4, 4', makes the dies 3, 3' press the circumference of the material tube hard at the spiral part D of the cylindrical metal core 2, and thus a spiral conformation is given to the circumference of the workpiece 1 between the dies 3, 3' and the spiral part D.

Figure 5:
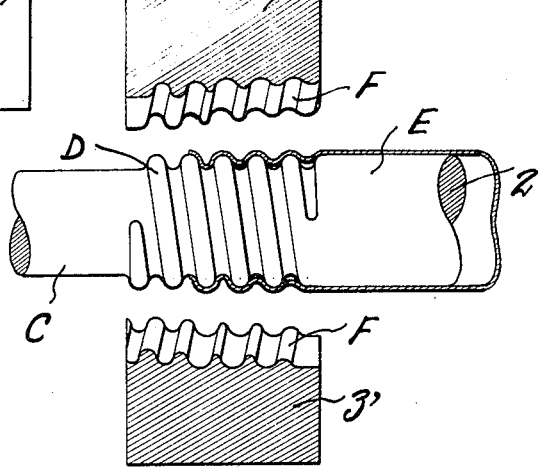
FIG. 5 is a vertical section side view to show the above-mentioned relation.

During the pressing by the dies 3, 3', the rollers 15, 15' slip on the surface of the material tube 1. The sliding pieces 4, 4' connected with the dies 3, 3' and the linking levers 5, 5' connected with the sliding pieces 4, 4' reciprocate twice during each turn of the crank 8; the turning and urging forward of the workpiece 1 by the rollers 15, 15' is done gradually through the intermediary of the reduction gear 17. As shown in FIG. 5, the depth of the female screw F of the dies 3, 3' is designed to increase in the same direction as the workpiece is advanced. This means that the formation of the spiral conformation on the workpiece is completed by several pressing motions of the dies 3, 3'. Due to this, it is possible to avoid producing any crack on the spiral tube thus produced.

When the spiral tube produced from the workpiece is advanced to the small diameter part C of the cylindrical metal tube 2, it is taken out from the machine by opening the vice 12. However, when two vices are provided for holding the large diameter part E of the cylindrical metal core 2 for the purpose of feeding the equipment with many tubular workpieces continuously by opening and closing these vices alternately, the vice 12 for holding the small diameter part C of the cylindrical metal core 2 becomes unnecessary. In such case, it may be possible to shorten the part C, provide the same type of rollers as the feeding rollers 15, 15' in the rear of the crank plate 10, take out the spiral tubes from the machine as they come out through the additional rollers in succession, and put them in a suitable container.

What I claim is:

1. A method of manufacturing a spiral metal tube having a substantially uniform wall thickness comprising supporting a metal tubular workpiece on a cylindrical core having a helical outer portion, positioning said core and said workpiece centrally within a plurality of dies having female die surfaces corresponding to said helical outer portion, urging said workpiece on said core toward said helical outer portion, and intermittently pressing said dies into said workpiece causing said workpiece to conform to the shape of said helical outer portion, the urging of said workpiece being terminated while said dies are pressing said workpiece against said helical outer portion, wherein said workpiece is formed into a spiral metal tube having a wall of substantially uniform thickness.

2. An apparatus for manufacturing a spiral metal tube from a metal tubular workpiece comprising a cylindrical core having a large diameter section for accommodating said tubular workpiece, a small diameter section for accommodating said manufactured spiral metal tube, and a helical outer portion located therebetween; vice means for firmly mounting said core above a base; roller means mounted on opposite sides of said large diameter section for urging said tubular workpiece toward said helical outer portion; and means for simultaneously terminating said urging of said tubular workpiece and pressing said workpiece into said helical outer portion to form said spiral metal tube, said means for simultaneously terminating and pressing comprising a plurality of dies having female die surfaces conforming to said helical outer portion, mounting plate means for mounting said plurality of dies circumferentially around said helical outer portion, guide grooves in said mounting plate means for providing sliding movement of said dies, linking levers connecting said dies to said mounting plate means, and crank means for reciprocally turning said mounting plate means, thereby causing said linking levers to move said dies in said grooves to press against said workpiece and to terminate said urging movement.

References Cited

UNITED STATES PATENTS

| 687,464 | 11/1901 | Sullivan | 72—398 |
| 2,419,678 | 4/1947 | Duenas et al. | 72—76 |
| 3,289,451 | 12/1968 | Koch et al. | 72—370 |

LOWELL A. LARSON, Primary Examiner

U.S. Cl. X.R.

72—401